United States Patent [19]

Lester

[11] Patent Number: 5,155,626
[45] Date of Patent: Oct. 13, 1992

[54] PASSIVE SAFETY REFLECTOR ARRANGEMENTS FOR VEHICLES

[76] Inventor: Wayne Lester, 2621 Plaza Del Amo, #511, Torrance, Calif. 90503

[21] Appl. No.: 623,182

[22] Filed: Dec. 6, 1990

[51] Int. Cl.⁵ .............................................. G02B 5/12
[52] U.S. Cl. ................................... 359/524; 359/533; 359/548; 359/549
[58] Field of Search ................... 350/97, 99, 103, 107, 350/100; 301/37 R; 359/515, 522, 524, 530, 533, 548, 549, 520

[56] References Cited

U.S. PATENT DOCUMENTS

| | | | |
|---|---|---|---|
| 3,781,082 | 12/1973 | Linder | 350/99 |
| 4,045,122 | 8/1977 | Burdick | 350/97 |
| 4,047,802 | 9/1977 | Pieters | 350/97 |
| 4,194,810 | 3/1980 | Eller | 350/99 |
| 4,223,980 | 9/1980 | Shafar | 350/97 |
| 4,256,366 | 3/1981 | Buckelew | 350/97 |
| 4,284,328 | 8/1981 | Drews | 350/97 |

Primary Examiner—Bruce Y. Arnold
Assistant Examiner—James Phan
Attorney, Agent, or Firm—John E. Halamka

[57] ABSTRACT

A passive reflective safety device for vehicles formed as a wheel cover, a fixed applique to the outside of the vehicle body, a fixed geometric shape attached to a rotational part of the vehicle or as a rotating wind driven vane attached to the vehicle. Each of the devices functions as a passive beacon to alert persons in other vehicles of the presence of the users vehicle. Each device is fabricated of rigid sheet material with a reflective layer applied to a visible side of the device. If transparent sheet material is used, the reflective layer may be applied to the inboard side of the device. The wind vane device may contain a governor to limit the rotational speed. A wind deflector may be installed in front of the vane device to encourage rotation in one direction.

14 Claims, 4 Drawing Sheets

PASSIVE SAFETY REFLECTOR ARRANGEMENTS FOR VEHICLES

BACKGROUND OF THE INVENTION

1. Field of the Invention

This invention relates to the vehicle safety art and, more particularly, to an improved reflector formed as a wheel cover, a fixed applique to the outside of the body, a fixed geometric shape attached to a rotational part or as a rotating wind driven vane attached to a vehicle to function as a passive beacon to alert others of the presence of the vehicle.

2. Description of the Prior Art

With traffic increasing on the ground and in the air, the art of alerting other vehicles of one's presence is becoming imperative. Solutions to this problem have been attempted by several devices.

One classification of solutions incorporate active elements such as transponders.

In many areas of the country, aircraft transponders are required to transmit information to ground based receivers. This information is used in areas of heavy traffic. The information from the transponders is used in conjunction with radar information to locate the position and altitude of aircraft. This data is displayed to Air Traffic control (ATC) which can warn aircraft of other traffic. It is however, ultimately every pilot's responsibility to see and avoid other aircraft, both in these areas of heavy traffic and in all circumstances.

Other active element solutions have suggested the use of transponders and receivers on all aircraft incorporated into a collision avoidance electronic system. This system requires the detecting vehicle to have a receiver and an information processor to calculate relative positions and to warn if preselected thresholds are exceeded. The cost, installation and maintenance of the transponder, receiver, and information processor is high. At present, only commercial and military aircraft may afford such systems. This does not solve the problem of small, private aircraft colliding with commercial or military aircraft.

To be effective, such a system would have to be required equipment. Without such a requirement, the user of a transponder would have no assurance that another vehicle in the vicinity of the user has the capability of transmitting to the user and/or receiving the indication of the user's presence.

Another classification of solutions incorporates as its active element a plurality of flashing or rotating lights. The lights are mainly effective only at night. This night time limitation is somewhat overcome by the use of bright strobe lights. However, under conditions of a clear sky with bright sun light, even the strobe light is washed out.

A source of light which is not washed out on a clear day is the sun. Reflective sunlight is passive, bright, may be directed in a wide arc and is certainly an attention grabber even to an inattentive person in another vehicle.

The accident figures from the NTSB show that for the period of 1983 to the present, of the 129 mid air collisions, 103 of them occurred under clear, sunny conditions.

U.S. Pat. No. 3,639,036 ('036) teaches the fabrication of a wheel cover with a reflective layer as a safety device. However, the reflective layer is formed on the inside of the cover and only usable when the cover is detached from the wheel and placed on edge such as during the changing of a flat tire.

Thus there has long been a need for an arrangement utilizing passive operation to indicate the presence of other vehicles in the vicinity of the user during daylight.

Further, it is desired that the arrangement be easily integrated onto the vehicle in a position which gives the largest angle of viewing to surrounding vehicles.

SUMMARY OF THE INVENTION

Accordingly, it is an object of the present invention to provide an improved arrangement which indicates the presence of a vehicle to other vehicles in its vicinity.

It is another object that the arrangement be passive and not require an active receiver in other vehicles.

It is another object that the signal generated by the arrangement be noticeable even to a person who is not fully attentive.

It is yet another object that the arrangement be easily installed on the users vehicle and provide the indication of the presence of the user vehicle over a wide angle of view.

The above and other objects of the present invention are achieved, according to a preferred embodiment thereof, by providing an improved vehicle reflector arrangement.

The arrangement may be formed as a wheel cover, as an applique to the body of the vehicle, as a geometrical shape attached to a rotational part of the vehicle or as a rotating wind driven vane.

In the preferred embodiment, a reflective layer is applied to one side of a sheet of rigid, transparent material which is formed in a shape to be mountable perpendicular to the axle of at least one of the wheels of the vehicle.

In another embodiment, a reflective layer is applied to one side of a sheet of rigid, transparent material which is formed in a shape to be compatible with a preselected outside portion of the vehicle. The sheet is cut to a preselected shape and attached to the vehicle by adhesive or fasteners.

In yet another embodiment, the sheet material is formed into a preselected three-dimensional geometrical shape such as a pyramid, a reflective layer is applied to the sheet material and the geometrical shape is attached to a preselected rotational element of the vehicle such as the hub of the main rotor of a helicopter.

In yet another embodiment, transparent sheet material with an internal reflective layer is formed into a wind driven vain rotatably attached to a base and mountable on a preselected outside portion of the vehicle. A governor may be attached to the axle of the vane to control the maximum rotational speed of the arrangement. A deflector may be mounted in front of the arrangement to direct air flow to favor one side of the device to encourage the rotation.

BRIEF DESCRIPTION OF THE DRAWINGS

The above and other embodiments of the present invention may be more fully understood from the following detailed description, taken together with the accompanying drawing, wherein similar reference characters refer to similar elements throughout, and in which.

DESCRIPTION OF A PREFERRED EMBODIMENT

Figure 1:
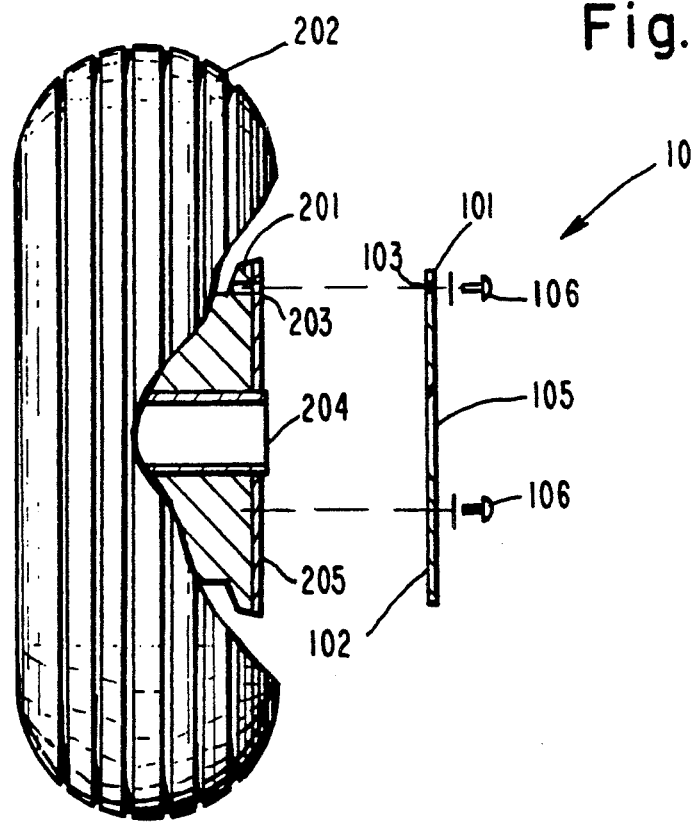
FIG. 1 is a cut away front view of a vehicle wheel to which the cover is being mounted.

Referring now to the drawing, FIG. 1 shows the preferred arrangement 10 according to the invention. The wheel cover 101 is fabricated of sheet material. The cover 101 is shaped to conform to the existing wheel 201 of the vehicle without interference with the tire 202. The general shape will be circular. If the axle cover 204 extends beyond the edge of the outboard edge 205 of the wheel 201, a cutout 105 may be formed in the center of the cover 101 to allow the cover 101 to be mounted adjacent to the outboard edge 205 of the wheel 201.

In the preferred arrangement 10, the sheet material is a transparent, rigid acrylic or such and is commercially available as PLEXIGLAS or LEXAN. A stock thickness of 1/16 to ¼ inch is preferred. The inboard side of the cover 101 is coated with a light reflective layer 102.

In the preferred embodiment, the reflective layer 102 is a coating such as that applied to mirrors.

The cover 101 may be fabricated of metal. The outboard side of the cover may be polished or coated with reflective material.

A plurality of mounting holes 103 are formed near the perimeter of the cover. Of course, if the vehicle wheel has tapped holes 203 to which a cover may be mounted, the mounting holes 103 should be positioned to correspond to these holes 203. If the vehicle wheel does not have existing mounts, the mounting holes 103 must be positioned so that corresponding holes 203 may be drilled and tapped into the vehicle wheel at a position which will maintain the structural and air tight integrity of the wheel 201.

The arrangement 10 is secured to the wheel 201 with a plurality of fasteners 106.

When applied to the wheels 201 of an aircraft, the reflective property of the cover 101 greatly increases the VFR pilot safety. The volume of space around a plane is so large that it is difficult to detect the motion of surrounding small planes which may be traveling on a radius. Even when the space is restricted such as during landing and takeoff, if the background below the vehicle is residential or commercial development, it is difficult for the pilot to detect a small geometrical shape of another vehicle against a background containing a plethora of geometrical shapes of buildings, towers, etc.

With a device constructed by the teaching of this invention to reflect sunlight by the mirrored surface, a reflection from a device such as the cover 101, can create a very intense flash which is certainly an attention grabber.

This safety factor is even more desired within the environment of small, private plane airports which may operate without any air traffic controller. The safety of air and ground vehicles depends upon visual detection.

Figure 2:
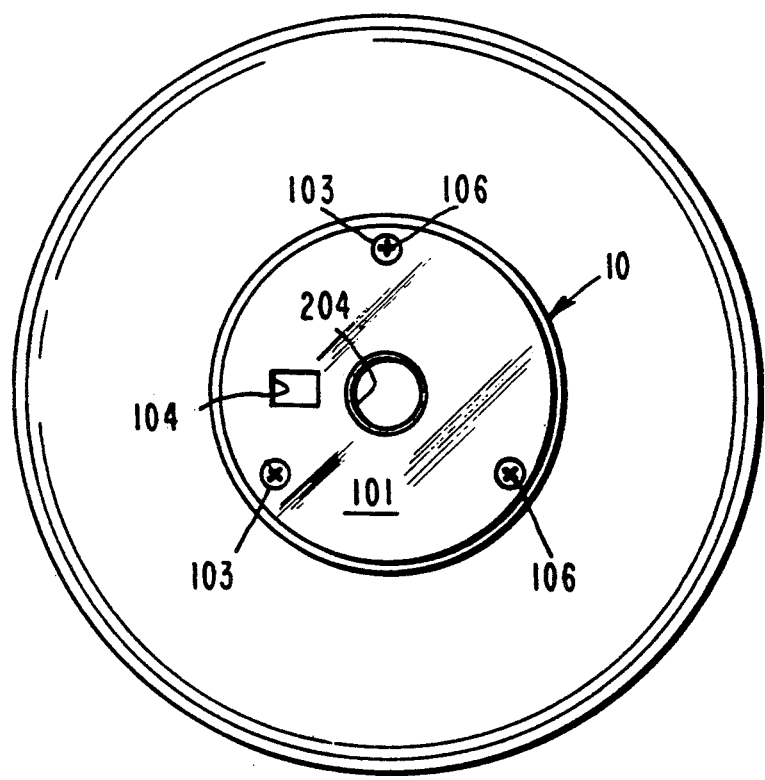
FIG. 2 is a side view of a vehicle wheel.

As shown in FIG. 2, an access hole 104 may be formed in the cover 101 to allow the user to check and fill the vehicle tire with air.

The cover 101 is mounted on the outside of a vehicle wheel 201 to be visible. Some vehicles such as airplanes have only one wheel mounted on a axle with no other wheels in alignment thereto such as a nose wheel. In this case a cover may be mounted on each side of the wheel to allow detection from both sides of the vehicle.

The cover 101 may be formed to be concave, convex or flat. The preferred embodiment is fabricated to have a flat surface. A concave outboard surface will tend to focus reflected light but after the focal point is reached the light will scatter at a rapid rate. A convex outboard surface will scatter the reflected light across a wider angle. However, as the same energy is spread over a larger area, the intensity of the reflected light will be decreased. Thus, the flat outboard surface is preferred.

For the preferred embodiment 10, the cover 101 is fabricated of a transparent material with a reflective layer 102 applied to the inboard side. Should dirt accumulate on the outboard surface, it may be removed without scratching the reflective layer 102. Should the outboard surface become scraped, the reflective layer 102 will still be intact with little loss of transmittance through the cover 101.

Figure 3:
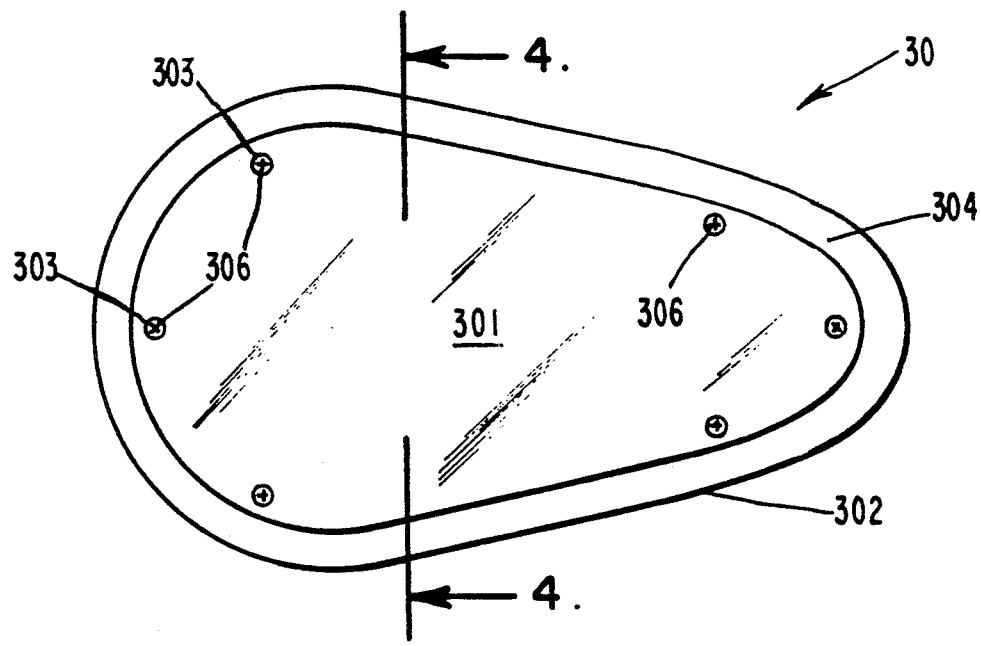
FIG. 3 is a plane view of another arrangement of the invention.

Now referring to the Drawing FIG. 3 there is shown another embodiment, generally depicted as the arrangement 30, fabricated of transparent sheet material 301 cut into a preselected shape. The sheet 301 may be heated, bent or otherwise formed to conform to a preselected part of the vehicle. A reflective layer 302 as described above is applied to the inboard side of sheet 301.

The peripheral edge of the sheet 301 may be formed as a bevel 304 to make the arrangement 30 more aerodynamic and to reduce induced drag cause by the installation of the arrangement 30 on the outside surface of the vehicle.

A suggestion is to form the sheet 301 to cover the "N" registration numbers of the vehicle which are required to be placed on the fuselage.

Another suggestion is to install the sheet 301 in the area around the existing safety lights of the vehicle so that the reflective layer 302 will enhance the safety light at night as well as serve as a passive safety device to reflect sunlight during daylight. The placement of the arrangement 30 around a strobe light is particularly effective.

A plurality of mounting holes 303 are formed in the sheet 301. The arrangement 30 may be attached to the preselected area of the vehicle by a plurality of fasteners 306 in the manner described above for the preferred embodiment 10.

Figure 4:
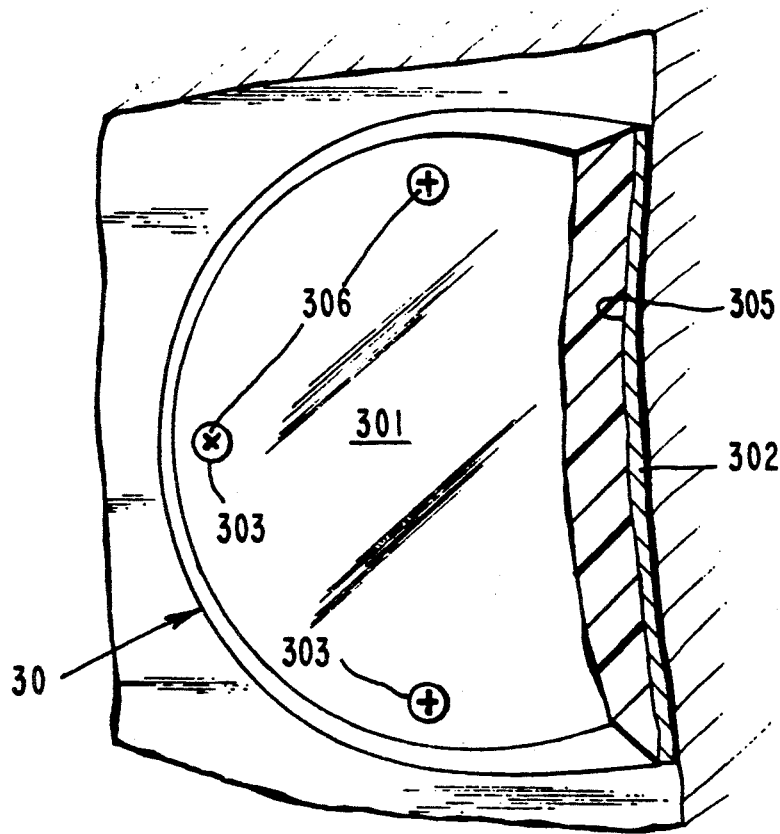
FIG. 4 is a cross-sectional view of FIG. 3.

FIG. 4, a cross section of FIG. 3 taken at 4—4, illustrates how the arrangement 30 may be curved to allow the placement of the arrangement on a preselected surface of the vehicle.

A layer of adhesive 305 may be applied to the inboard side of the arrangement 30 to be the primary mechanism of attachment or assist in attaching the arrangement 30 to portions of the vehicle which cannot be drilled and/or taped to accommodate a fastener 306.

A 1/16 to ¼ inch thick sheet stock is preferred over a thin sheet of material such as MYLAR as the shear forces of wind drag may tear or displace even strong, thin sheet material. Further, the thin sheet material is not an effective reflector as the thin sheet material will tend to ripple and disburse the reflection.

Figure 5:
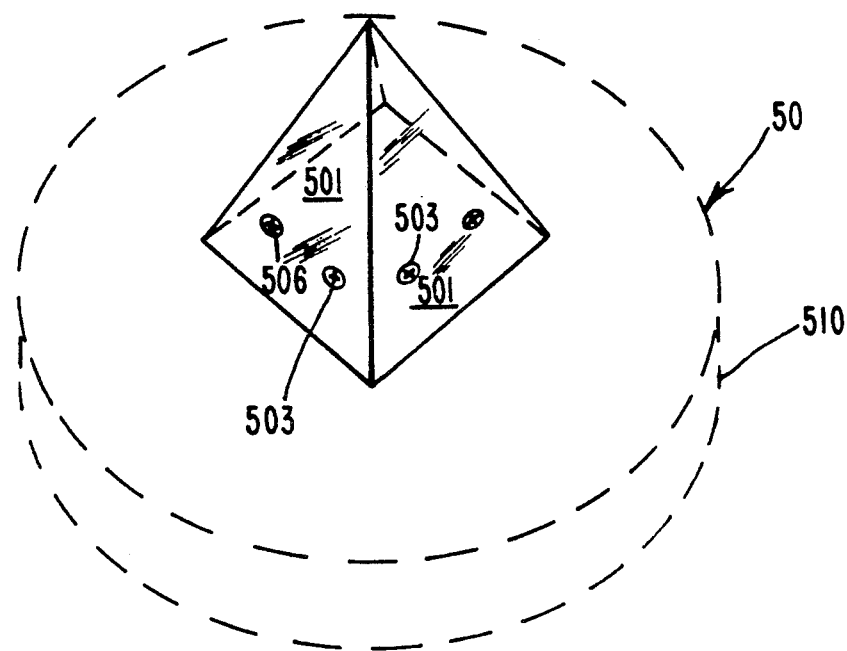
FIG. 5 is a perspective view of yet another arrangement of the invention.

Referring now to the Drawing FIG. 5 there is shown yet another embodiment, generally designated as arrangement 50, fabricated of sections of ridged, transparent sheet material 501 to form a preselected geometric shape. The shape depicted by arrangement 50 is a pyramid. The size and shape of the arrangement 50 is chosen to be compatible with a preselected rotational surface of the vehicle such as the hub 510 of the main rotor of a helicopter. The arrangement 50 may be attached to the hub 510.

Helicopters may utilize the altitudes of 500 to 2000 feet for a considerable time. Police and traffic helicopters frequently maneuver at a low level. This often takes them under the flight path of major airports. The arrangement 50 as fabricated according to the teachings of this invention, greatly add to the visibility of the vehicle from above.

Figure 6:
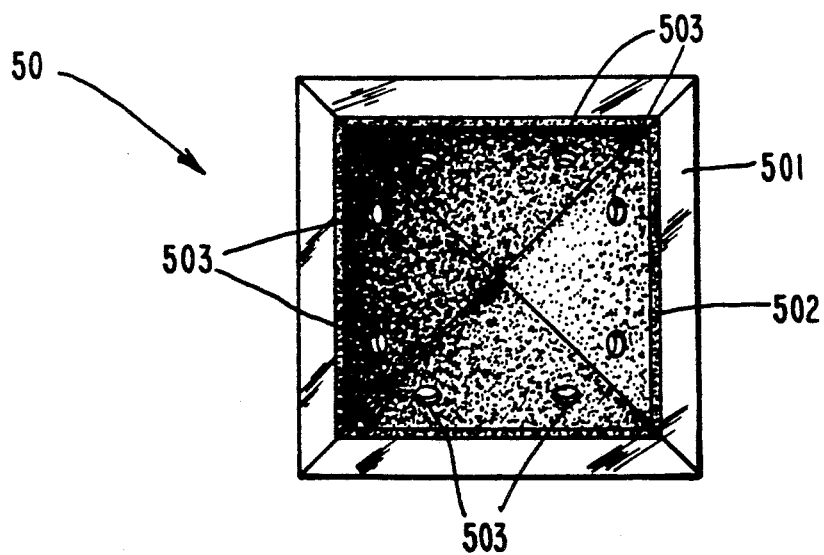
FIG. 6 is a bottom plane view of the arrangement shown in FIG. 5.

FIG. 6 depicts an underside view of the arrangement 50. The reflective layer 502 is applied to the inclosed area of the chosen geometric figure. A plurality of mounting holes 503 is formed in the arrangement 50 to allow the device to be attached to the outer surface of the hub 510 with a plurality of fasteners 506.

Alternatively, a replacement hub 510 may be fabricated with a plurality of flat surfaces at preselected angles to form the preselected geometric shape to which a plurality of arrangements 30, described above, may be attached in a position essentially coplanar with each flat surface.

Figure 7:
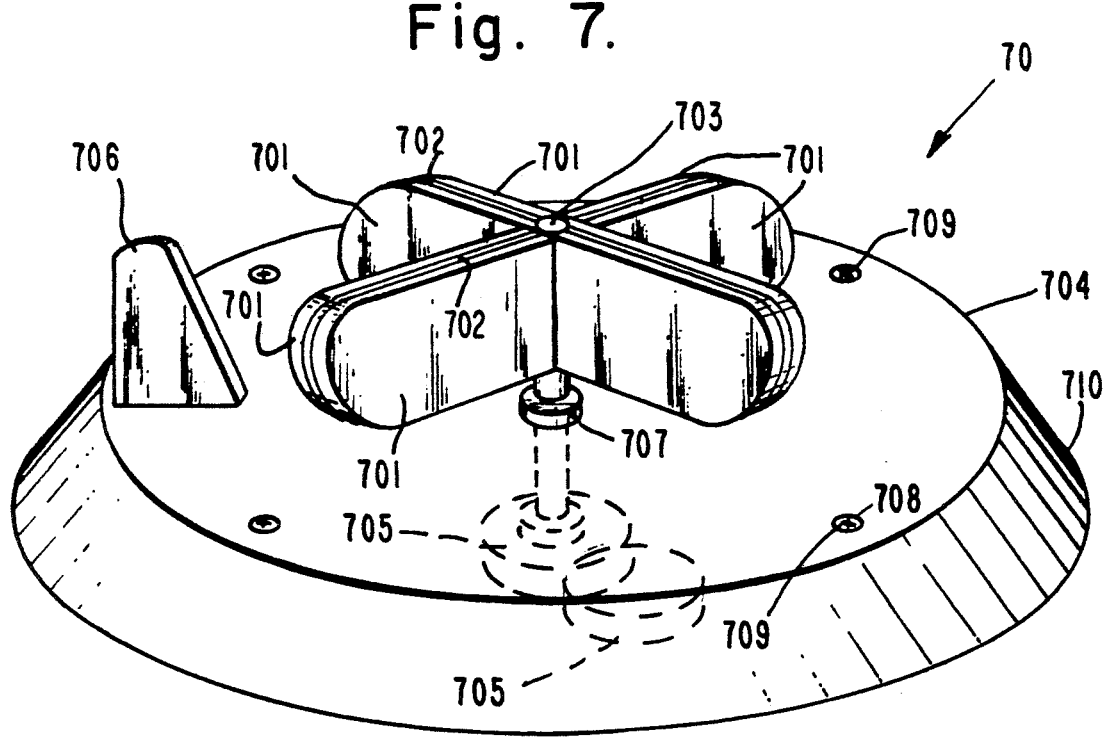
FIG. 7 is a perspective view of yet another arrangement according to the invention.

Referring now to the Drawing FIG. 7 there is shown yet another embodiment, generally designated as arrangement 70, fabricated from a plurality of transparent sheets 701 to form a vane.

A double reflective layer 702 is surrounded on each side by a sheet 701 for protection. This sandwich may be formed as shown into an "X" shaped vane mounted on a rotational shaft 703. One end of the shaft 703 may be mounted by a bearing 707 into a base 704.

The peripheral edge of the base 704 may be formed as a bevel 710 to make the arrangement 70 more aerodynamic and to reduce induced drag cause by the installation of the arrangement 70 on the outside surface of the vehicle.

A plurality of mounting holes 708 may be formed in the base 704. The base 704 may then be mounted by means of a fasteners 709 to a preselected area of the vehicle which is exposed to air flow while the vehicle is in motion. The rotating reflecting layer 702 will cover a wide area around the vehicle with sweeping reflections.

A deflector 706 may be mounted on the base 704 in front of the vane to direct the air flow to one side to encourage rotation of the vane in one direction.

Because the air flow may spin the arrangement 70 at a high RPM, a governor 705 may be mounted in the base 704 and attached to the end of the shaft 703 extending through the bearing 707.

Since certain change may be made in the above apparatus without departing from the scope of the invention herein involved, it is intended that all matter contained in the above description, as shown in the accompanying drawing, shall be interpreted in an illustrative, and not a limiting sense.

What is claimed is:

1. A passive safety device for a vehicle comprising in combination:

a rigid cover fabricated of transparent sheet material in a shape mountable on a preselected outboard area of said vehicle;

a beveled surface formed around the periphery of said cover;

a reflective layer applied to the inboard side of said transparent material;

a plurality of walls forming mounting holes at selected positions near the periphery of said cover whereby the user may attach said cover to said preselected outboard area of said vehicle with fasteners.

2. A device as recited in claim 1, further comprising an adhesive layer applied to said reflective layer to assist in fastening said cover to said vehicle.

3. A passive safety device for a vehicle, having at least one exposed wheel, comprising in combination:

a rigid cover fabricated of sheet material in a shape mountable on at least one outboard side of said wheel essentially perpendicular to the axle of a preselected wheel of said vehicle, said rigid cover having a cutout of a preselected central portion of said cover whereby said cover being mounted adjacent to the outboard surface of said wheel under that condition of said wheel having an axle cover extending beyond the outboard surface of said wheel;

a reflective layer applied to a visible surface of said cover; and, a plurality of walls forming mounting holes at selected positions near the periphery of said cover whereby the user may attach said cover to a visible surface of said wheel with fasteners.

4. A passive safety device for a vehicle, having at least one exposed wheel, comprising in combination:

a rigid cover fabricated of transparent sheet material in a shape mountable on at least one outboard side of said wheel essentially perpendicular to the axle of a preselected wheel of said vehicle;

a reflective layer applied to a visible surface of said cover; and, a plurality of walls forming mounting holes at selected positions near the periphery of said cover whereby the user may attach said cover to a visible surface of said wheel with fasteners.

5. A device as recited in claim 4 wherein said reflective layer is applied to the inboard side of said transparent material.

6. A passive safety device for a vehicle having a rotating, outboard surface and comprising in combination:

a plurality of rigid covers fabricated of sheet material and attached at preselected peripheral edges to form a preselected geometrical shape having a top and a base;

a reflective layer applied to a visible surface of each of said rigid covers; and, a plurality of walls forming mounting holes at selected positions near said base of said geometrical shape whereby the user may attach said geometrical shape to said rotating outboard surface of said vehicle with fasteners.

7. A device as recited in claim 6 wherein said sheet material is transparent.

8. A device as recited in claim 7 wherein said reflective layer is applied to the inboard side of said transparent material.

9. A passive safety device for a vehicle having a hub for a rotating, outboard surface and comprising in combination:

a replacement hub for said hub fabricated with an outboard surface containing a plurality of flat surfaces at preselected angles;

a plurality of rigid covers fabricated of sheet material; at least one of said covers formed in a shape to be mounted in a position which is coplanar with each of the replacement hub flat surfaces;

a reflective layer applied to a visible surface of each of said plurality of covers; and, a plurality of walls forming mounting holes at selected positions near the periphery of said covers whereby the user may attach at least one of said covers to the outboard side of each said flat surface of said replacement hub flat surfaces with fasteners, under the condition of said replacement hub installed in place of said hub.

10. A passive safety device for a vehicle having an outboard surface exposed to air flow while the vehicle is in motion and comprising in combination:

a base;

a shaft rotatably mounted in said base;

a plurality of pairs of rigid covers fabricated of transparent sheet material, formed as a vane and mounted on said shaft;

a double reflective layer sandwiched between said pairs of covers; and, a plurality of walls forming mounting holes in said base whereby the user may attach said base to said outboard surface of said vehicle in a position to be exposed to said air flow.

11. A device as recited in claim 10, further comprising a bearing mounting between said rotational shaft and said base.

12. A device as recited in claim 10, further comprising a bevel formed in the peripheral edge of said base.

13. A device as recited in claim 10, further comprising a governor mounted in said base and attached to to the end of said rotational shaft extending into said base whereby the RPM of said rotational shaft is controlled.

14. A device as recited in claim 10, further comprising a deflector mounted on said base in front of said vane mounted on rotational shaft whereby said air flow is directed to one side to promote the rotation of said vane in one direction.

* * * * *